(12) United States Patent
Sullivan et al.

(10) Patent No.: US 12,423,049 B2
(45) Date of Patent: Sep. 23, 2025

(54) COMPANION DEVICES AS PRODUCTIVITY TOOLS

(71) Applicant: Microsoft Technology Licensing, LLC, Redmond, WA (US)

(72) Inventors: Kathryn Veronica Jean Sullivan, Redmond, WA (US); Jonathan Seth Kaufthal, Seattle, WA (US); Ian Dwyer Curry, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 262 days.

(21) Appl. No.: 17/347,089

(22) Filed: Jun. 14, 2021

(65) Prior Publication Data

US 2022/0398056 A1    Dec. 15, 2022

(51) Int. Cl.
*G06F 3/14* (2006.01)
*G06F 3/147* (2006.01)
*H04L 67/10* (2022.01)

(52) U.S. Cl.
CPC ............ *G06F 3/147* (2013.01); *G06F 3/1423* (2013.01); *G06F 3/1462* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 8,700,719 | B1* | 4/2014 | Covitz | G06Q 10/107 709/204 |
| 9,274,674 | B2* | 3/2016 | Moromisato | G06F 16/168 |
| 9,389,745 | B1* | 7/2016 | Leatham | G06F 3/04817 |
| 10,073,599 | B2* | 9/2018 | Khoury | G06F 3/1423 |
| 10,200,443 | B2* | 2/2019 | Bentley | H04L 67/10 |
| 2011/0252303 | A1* | 10/2011 | Lemonik | G06F 40/197 715/234 |
| 2014/0315492 | A1 | 10/2014 | Woods | |
| 2016/0092416 | A1* | 3/2016 | Kohlmeier | G06F 16/951 715/202 |
| 2017/0017372 | A1* | 1/2017 | Choi | G06F 3/0488 |
| 2017/0060514 | A1 | 3/2017 | Kaufthal et al. | |
| 2020/0097340 | A1 | 3/2020 | Balik et al. | |
| 2020/0333994 | A1* | 10/2020 | Sepulveda | G06F 3/04883 |
| 2021/0133253 | A1* | 5/2021 | Underwood | H04L 67/1097 |

OTHER PUBLICATIONS

"International Search Report & Written Opinion issued in PCT Application No. PCT/US22/028965", Mailed Date: Aug. 29, 2022, 12 Pages.

* cited by examiner

*Primary Examiner* — Irete F Ehichioya
*Assistant Examiner* — Samuel Shen

(57) ABSTRACT

In various implementations, tools and features of productivity applications may be shared across companion devices to manipulate a document and/or application surfaced in a user interface of a primary device. The companion devices may synchronize state information to edit or otherwise interact with the document and/or application. For example, state information of a the document and/or application displayed in a user interface of the primary device may be shared with one or more companion devices, which in turn surface suggestions and/or tools curated based on the state information. A user may use the productivity tools to manipulate content of the document or otherwise interact with the application running on the primary device.

20 Claims, 13 Drawing Sheets

COMPANION DEVICES AS PRODUCTIVITY TOOLS

BACKGROUND

Distributed computing systems (e.g., cloud computing systems) use computing resources interconnected over a network to provide multiple users with access to a single document. Each user may access view and edit the document using a local version of an application at the same time as other users edit their instances of the same document using their local versions of an application. The local versions of the documents may then display the edits of each user in near real-time.

However, the user experience with an application is limited to the local version of the application's user interface and the display device used to present the user interface. For example, when a user opens an application on their local device, the user interface of the application is limited to the screen real estate available to the local device. When multiple monitors are available, the user interface may be expanded across as much or as little screen real estate provided by the local monitors, but a user's interaction with the application is limited to the local version of the user interface. Therefore, when the same document is accessed by two client devices and a feature of the local user interface is displayed via the first client device (e.g., color palette, search function, insert function, font types, design layouts, predictive text, etc.), the second client device cannot interact with the feature displayed by the first client device.

The subject matter claimed herein is not limited to embodiments that solve any disadvantages or that operate only in the environments described above. Rather, this background is only provided to illustrate an exemplary technology area in which some embodiments described herein may be practiced.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods, and devices for coordinating productivity tools across companion devices are disclosed herein. The companion devices may synchronize state information of application features to edit or otherwise interact with a digital document. For example, a document may be displayed in a user interface of an application running on a primary device, and state information about the document and/or the application may be shared with one or more companion devices. The one or more companion devices may curate suggestions and/or features (e.g., based on the state information) and display the suggestions and/or features to manipulate content of the document or otherwise interact with the application running on the primary device.

BRIEF DESCRIPTION OF THE DRAWINGS

Non-limiting and non-exhaustive examples are described with reference to the following figures.

DETAILED DESCRIPTION

Figure 1:
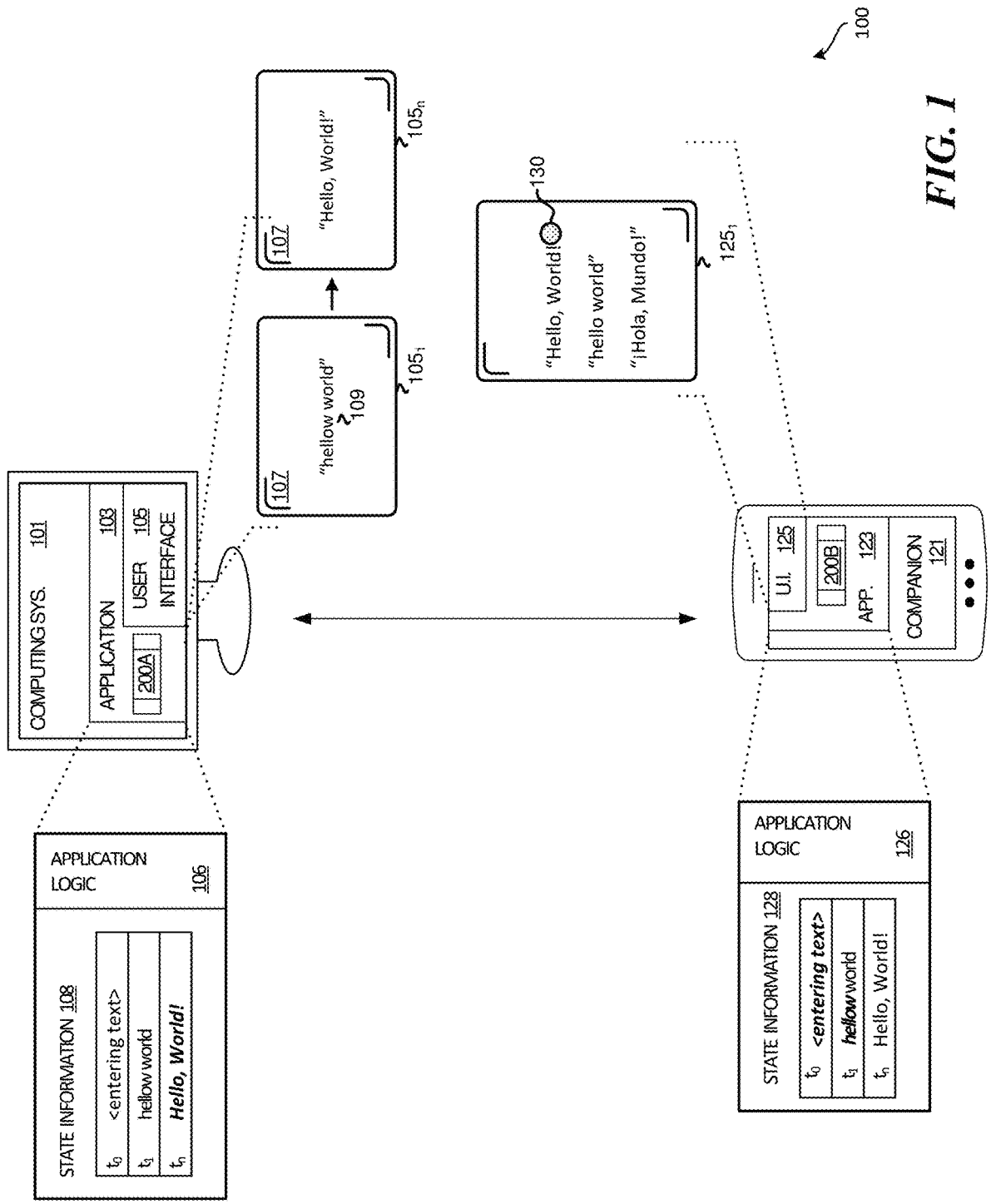
FIG. 1 is a schematic diagram illustrating an example distributed computing environment for coordinating productivity tools across companion devices.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Technology is disclosed herein for coordinating productivity tools across companion devices. In various implementations, mobile devices (e.g., smart phone, tablet, augmented reality device, etc.) can be used as connected user interface displays to perform microtasks and take actions in productivity applications (e.g., productivity solutions offered by Microsoft® 365, Google® Workspace, etc.) executing on a separate, primary device (e.g., personal computer, laptop, smart phone, tablet, projector, etc.).

For example, a primary computing device may execute a word processing application having one or more collaboration components (i.e., features) displayed by the computing device in a user interface of the application. State information (e.g., of the application, of a document created by the application, of a collaboration component of the document, etc.) may be shared with a companion device operatively connected to the primary device. Based on the state information, the companion device may curate suggestions for editing or otherwise interacting with the one or more collaboration components and display via its screen, monitor, holographic lens, or other suitable display device, the suggestions. For example, if an image is displayed in a document via a primary device, the companion device may act as additional screen real estate of the primary device and surface a suggestion to apply a filter to the image (e.g., without also displaying the image in the same user interface as the suggested filter).

Subsequent to a user selecting or otherwise electing one or more of the suggestions, state information pertaining to the selection may be shared with the primary device and subsequently used by the application to update the collaboration component. Continuing with the previous example, if a user selects the filter in the companion device, the image displayed via the primary device will be updated to reflect the selected filter without first having to update the image locally on the companion device. In other words, the companion device may be implemented as an alternative user interface to the primary device for interacting with the application executed by the primary device and/or any documents presented in a user interface via the primary device.

The systems, methods, and devices described herein provide an improved means for coordinating productivity tools across companion devices. For example, existing solutions limit interactions with a user interface of an application to inputs received via the local device executing the application. The systems, methods, and devices described herein provide an inventive means over existing solutions by at least allowing inputs received via a separate, companion computing device to update a user interface surfaced in a separate, primary device. The benefits of this novel arrangement include, but are note limited to, increased screen real estate that facilitates a more efficient execution of microtasks. For example, using a mobile phone screen to provide suggestive content prevents the occlusion of content in a user interface displayed via a primary computing device. Additionally, the increased screen real estate allows for more robust suggestions and feature explanations. Also, the use of a secondary device (e.g., a mobile device) to receive voice inputs, touch inputs, gesture inputs, and the like may be an improvement over the input methods available via the primary computing device. Additional benefits of the technology disclosed herein are contemplated herein and are not expressly recited only for the sake of brevity.

Turning now to the drawings, FIG. 1 illustrates a schematic diagram of example computing environment 100 for coordinating productivity tools across companion devices. Computing environment 100 includes computing system 101 and companion device 121. Computing system 101 is representative of any physical or virtual computing resource, or combination thereof, suitable for executing application 103, of which computing device 600 is representative. Examples of computing system 101 include, but are not limited to, personal computers, laptop computers, tablet computers, mobile phones, wearable devices, external displays, virtual machines, and containers, as well as any variation, combination, or collection thereof. Computing system 101 may communicate with companion device 121 via one or more network connections (not shown), examples of which include internets and intranets, the Internet, wired and wireless networks, low power wireless links, local area networks (LANs), and wide area networks (WANs).

Figure 2B:
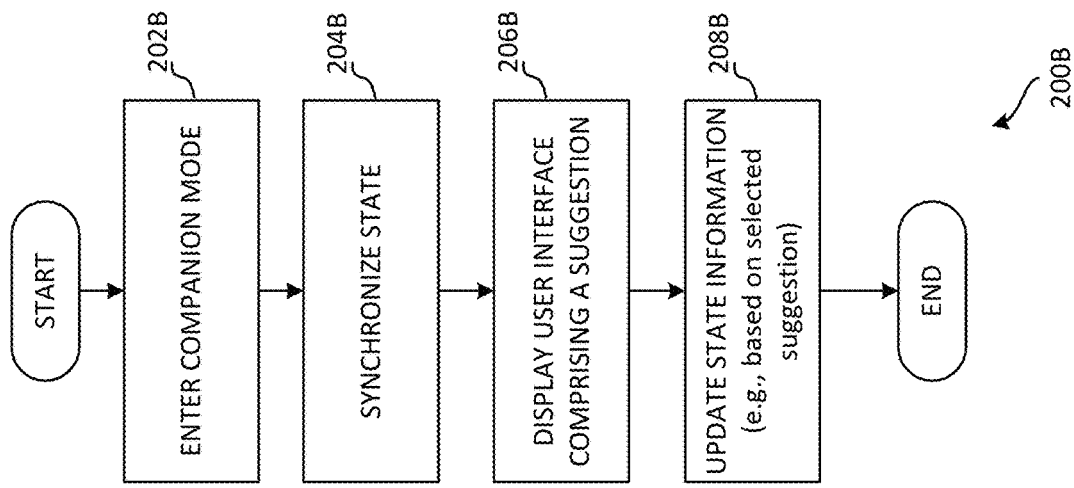
FIG. 2B illustrates a method for an implementation of coordinating productivity tools across companion devices.
Figure 2A:
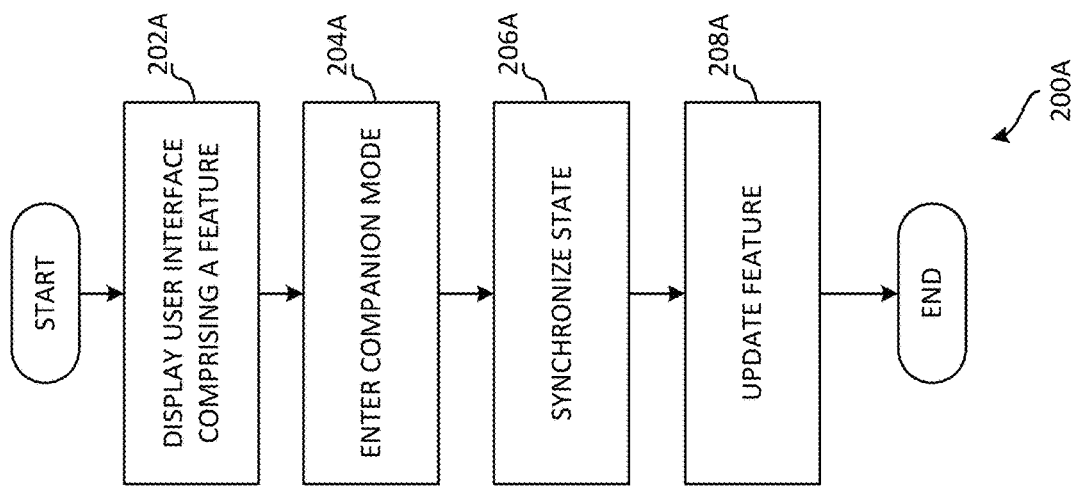
FIG. 2A illustrates a method for an implementation of coordinating productivity tools across companion devices.

Application 103 is implemented in software and, when executed by computing system 101, renders user interface 105. Application 103 is implemented in program instructions that comprise various software modules, components, and other elements of the application. Application logic 106 and companion device operation 200A (as illustrated by process 200A of FIG. 2A) are representative of some of the functionality that may be provided by one or more of the software elements in application 103. Some commercial examples of application 103 include, but are not limited to, Microsoft® PowerPoint®, Prezi®, Google® Slides, Microsoft® Excel®, Google® Sheets, Microsoft® Word, etc. Application 103 may be a locally installed and executed application, a desktop application, a mobile application, a streamed (or streaming) application, a web-based application that is executed in the context of a web-browser, or any other type of application capable of employing companion device operation 200A.

Companion device 121 is representative of any physical or virtual computing resource, or combination thereof, suitable for executing application 123, of which computing device 600 is representative. Examples of companion device 121 include, but are not limited to, tablet computers, mobile phones, wearable devices, alternative reality device, as well as any variation, combination, or collection thereof. Companion device 121 may communicate with computing system 101 via one or more network connections (not shown), examples of which include internets and intranets, the Internet, wired and wireless networks, LANs, and wide WANs.

Application 123 is implemented in software and, when executed by companion device 121, renders user interface 125. Application 123 is implemented in program instructions that comprise various software modules, components, and other elements of the application. Application logic 126 and companion operation 200B (as illustrated by process 200B of FIG. 2B) are representative of some of the functionality that may be provided by one or more of the software elements in application 123. Some commercial examples of application 123 include, but are not limited to, Microsoft® PowerPoint®, Prezi®, Google® Slides, Microsoft® Excel®, Google® Sheets, Microsoft® Word, etc. Application 123 may be a locally installed and executed application, a desktop application, a mobile application, a streamed (or streaming) application, a web-based application that is executed in the context of a web-browser, or any other type of application capable of employing companion device operation 200B.

Companion device operations 200A and 200B may be implemented in program instructions in the context of any of the software applications, modules, components, or other such elements of computing device 101 and companion device 121 such as productivity applications, operations system software, application frameworks, and/or other software. The program instructions are executed by one or more processors and may direct computing device 101 and companion device 121 to operate as follows, referring parenthetically to the steps in FIGS. 2A and 2B in the context of computing environment 100 for exemplary purposes.

To begin, computing system 101 displays user interface 1051 comprising feature 109 (step 202A). In the present implementation, feature 109 is a text feature of productivity document 107. Examples of productivity document 107 include, but are not limited to word processing documents, spreadsheet documents, note taking documents, electronic messages, slide presentations, and the like. Other collaboration components may include image features (e.g., pictures, icons, images, etc.), graphic features (e.g., bar graphs, line graphs, etc.), data features (e.g., charts, tables, etc.), menu features (e.g., clipboard, spell check, review, references, color and/or hue selectors, etc.), object gallery, and the like.

Computing device 101 may enter companion mode (step 204A) and companion device 121 may enter companion mode (step 202B), or they may already be in companion mode. While in the companion mode, computing device 101 and companion device 121 may be operatively coupled (e.g., via one or more network connections) to share state information 108 of application 104 and state information 128 of application 123. State information 108 may be stored locally by application 103 and/or in a distributed data structure (not shown). State information 128 may be stored locally by application 123 and/or in a distributed data structure (not shown). State information 108 and 128 are used to synchronize the user experience across computing device 101 and companion device 121 (step 206A and 204B). As content is surfaced, edited, and otherwise manipulated via application 103, the state of application 103 and/or productivity document 107 changes. As a result, application 123 curates and/or otherwise generates user interface 125 to surface relevant content and/or suggestions (e.g., based on the state of application 103 and/or productivity document 107) (step 206B).

For example, while in the companion mode, companion device 121 determines, at time "$t_0$" application 103 and/or document 107 has a state of "<entering text>." As a result, application 123 may refrain from surfacing suggestions in user interface until state information 108 changes to reflect the entered text. At time "ti", state information 108 has changed to "hellow world." Subsequent and/or in response to this state change, application 123 may analyze state information and determine that feature 109 contains a misspelled word (i.e., hellow). In response to detecting the misspelled word, application 123 curates suggestions for editing feature 109 and causes display of the suggestions in user interface 1251. The suggestions may be curated (e.g., selected, aggregated, generated, etc.) from a single source (e.g., application library, etc.) or a combination of sources (e.g., application library and online search, etc.). The curated suggestions may be generated through the use of machine learning techniques via which suggestions are refined overtime based on historic user responses (e.g., generating a learning set of data to use as a vector input, wherein the learning set of data comprises a context of application 103 and/or productivity document 107 and the suggestion selected by a user relative to the context, etc.).

A user (not shown) may select one or more of the suggestions via user interface 1251 as demonstrated by user selection 130. User selection 130 may be made by way of a mouse action, a touch input, a glance gesture, a hand gesture, a spoken command, or any other suitable user input.

Subsequent to receiving user selection 130, state information 128 is updated at time "$t_n$" based on user selection 130 (step 208B), and state information 108 is updated and synchronized with state information 128 (step 206A). In response to synchronizing states, feature 109 is updated to reflect the selected suggestion(s) (step 208A). Updated feature 109 is then displayed in user interface $105_n$.

Figure 3:
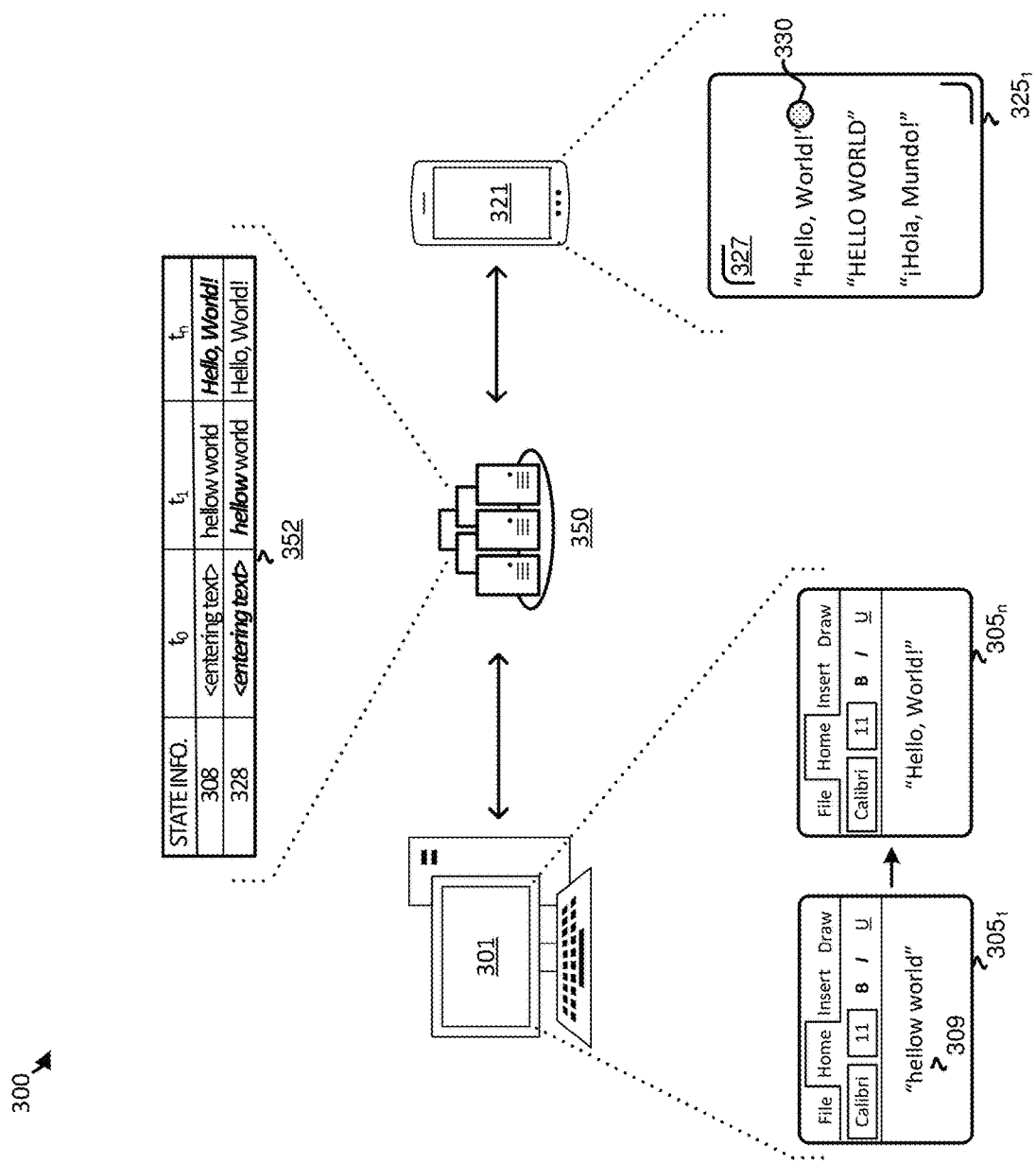
FIG. 3 is a schematic diagram illustrating a software architecture in an implementation of coordinating productivity tools across companion devices.

FIG. 3 illustrates a schematic diagram of example computing environment 300 for coordinating productivity tools across companion devices via relay server 350. Computing environment 300 comprises primary computing device 301, companion device 321, and relay server 350. Primary computing device 301 and companion device 321 are representative of any physical or virtual computing resource, or combination thereof, suitable for executing companion operations 200A and 200B (as illustrated by processes 200A and 200B of FIGS. 2A and 2B, respectively), of which computing device 600 is representative. Examples of primary computing device 301 and companion device 321 include, but are not limited to, desktop computers, laptop computers, tablet computers, mobile phones, wearable devices, virtual machines, and containers, as well as any variation, combination, or collection thereof. Relay server 350 is representative of any physical or virtual computing resource, or combination thereof, suitable for ordering incoming operations, broadcasting the operations to connected clients, and storing relay data in the form of summary operations (e.g., table 352), of which computing device 600 is representative. Relay server 350 may synch state information and/or content of connected clients of which primary device 301 and companion device 321 are examples.

In the present implementation, primary computing system 301 displays user interface 3051 comprising feature 309. When in the companion mode, relay server 350 uses table 352 to synchronize the state information 308 of computing device 301 and state information 328 of companion device 321. State information 308 and 328 are used to coordinate the user experience across computing device 301 and companion device 321. As content is surfaced, edited, and otherwise manipulated via computing device 301, state information 308 is updated to reflect state changes. Similarly, as a user interacts with content surfaced via companion device 321, state information 328 is updated to reflect state changes. In response to state changes, relay service 350 updates table 352 and pushes the state changes to update computing device 301 and companion device as needed.

For example, while in the companion mode, at time "$t_0$" state information 308 of primary computing device 301 is updated in table 352 to reflect the state change "<entering text>". Relay service 350 updates state information 328 of companion device 321 to reflect the change in state of computing device 301. Subsequent and/or in response to the update to state information 328, companion device 321 refrains from surfacing suggestions in user interface 325 until state information 308 changes to reflect the text actually entered. At time "ti", state information 308 has changed to "hellow world," and relay service 350 synchronizes state information 328 to reflect the changed state. Subsequent and/or in response to this state change, companion device 321 may curate and/or generate suggestions for feature 309 (e.g., to remove and replace the misspelled word "hellow", etc.). The suggestions may then be surfaced in user interface 3251.

Figure 4:
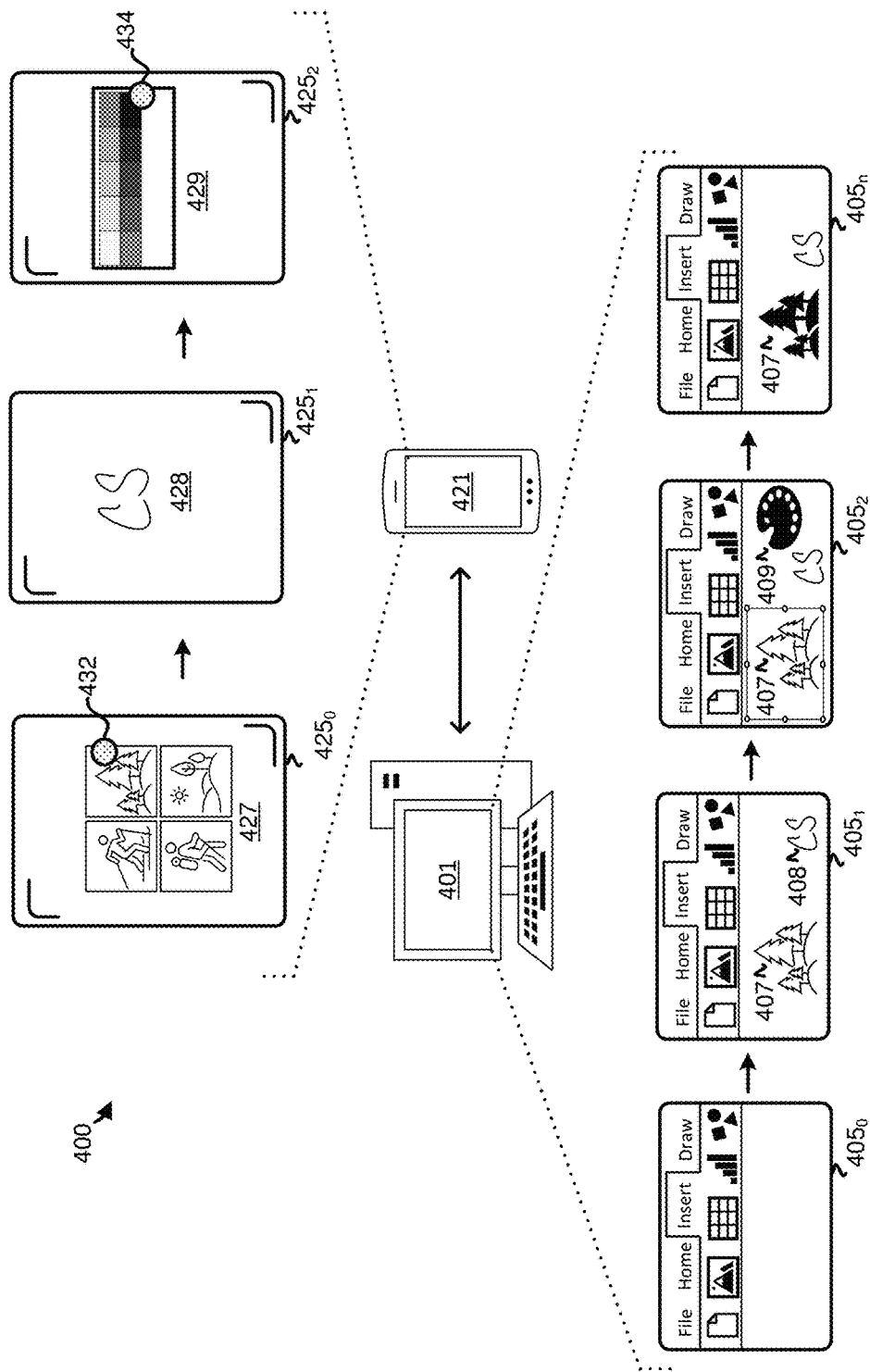
FIG. 4 is a schematic diagram illustrating a software architecture in an implementation of coordinating productivity tools across companion devices.

A user (not shown) may select one or more of the suggestions via user interface 3251 as demonstrated by user selection 330. User selection 330 may be made by way of a mouse action, a touch input, a glance gesture, a hand gesture, a spoken command, or any other suitable user input. Subsequent to user selection 330, relay 350 may update state information 328 at time "$t_n$" based on user selection 330, and subsequent synchronizes state information 308 to reflect the update to state information 328. In response to synchronizing states, feature 309 is updated to reflect the selected suggestion(s) and displayed in user interface 305, FIG. 4 illustrates a schematic diagram of example computing environment 400 for coordinating productivity tools across companion devices. In the present implementation, computing system 401 displays user interfaces $405_{0-n}$ and companion device 421 displays user interfaces $425_{0-1}$. While in a companion mode, companion device 421 detects, based on a state of primary computing system 401, that a tab ribbon feature is presented in user interface $405_0$. In response, companion representation 427 is generated and surfaced in user interface $425_0$ comprising curated suggestions. The suggestions may be curated from a single source (e.g., application library, etc.) or a combination of sources (e.g., application library and online search, etc.). The curated suggestions may be generated through the use of machine learning techniques via which suggestions are refined overtime based on historic user responses. Subsequent and/or in response to user input 432, state information of companion representation 427 may be updated based on user input 432 and synchronized with computing system 401, which adds image feature 407 to user interface $405_1$.

Next, a user may hand draw companion representation 428 via user interface $425_1$. Subsequent and/or in response to drawing companion representation 428, state information of companion device 421 may be updated and synchronized with computing system 401. Computing system 401 may then surface signature feature 408 in user interface $405_1$.

A user may select image feature 407 in user interface $405_1$ and invoke color palette feature 409. State information of computing system 401 may be updated to reflect the invocation of color palette feature 409 and shared with companion device 421 for synching user interface $425_2$. Subsequent to synching user interface $425_2$, companion representation 429 is display in user interface $425_2$ via companion device 421. User input 434 is then received in association with a hue of companion representation 429. The states of companion representation 429 and color palette feature 409 may be synched and image feature 407 updated in user interface $405_n$ to reflect the state change and/or selected hue of companion representation 429.

Figure 5:
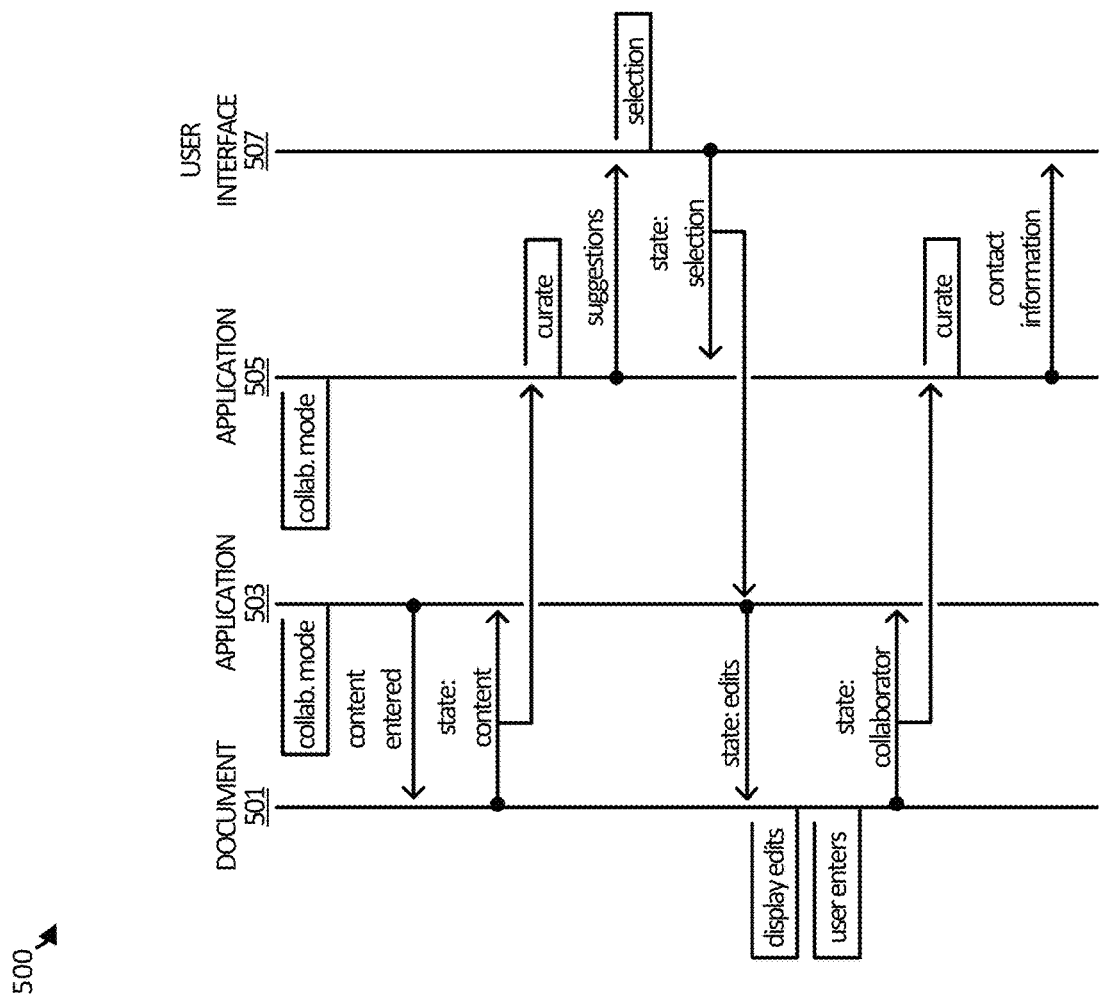
FIG. 5 illustrates an operational sequence of coordinating productivity tools across companion devices.

FIG. 5 illustrates an operational sequence 500 in a highly simplified example. Operational sequence 500 involves productivity document 501, applications 503 and 505, and user interface 507. Application 503 is representative of an application executed by a primary computing device through which document 501 may be displayed in a user interface of application 503. Application 505 is representative of an application executed by a companion device through which user interface 507 may be displayed.

To begin, applications 503 and 505 enter a collaboration mode through which state information may be shared. Via application 503, content may be entered, added, obtained, or otherwise manipulated in document 501. Subsequent and/or in response to the manipulated content, the state of document 501 is updated and synchronized, via application 503, with application 505. The state information is used to curate suggestions for display in user interface 507. In response to a selection of at least one of the suggestions, state information of application 505 is updated and synchronizes with the state information of application 503. Subsequent and/or in response to the synchronized state information, application 503 edits the content of document 501 (e.g., to incorporate the selected suggestion), and displays the edited content in a user interface.

Next, a collaborator accesses document 501 (e.g., for editing, viewing, etc.). In response to detecting the collaborator, a subtle icon may be displayed, via the primary computing system, in association with document 501, and the state of document 501 may be updated and synchronized, via application 503, with application 505. The state information may be used to curate contact information for the collaborator for display in user interface 507. The curated contact information may comprise collaborator's full name, photo, title, details of activity in document, are surfaced. Options for contacting collaborator (e.g., email, text, skype, etc.) may also be presented.

Figure 6:
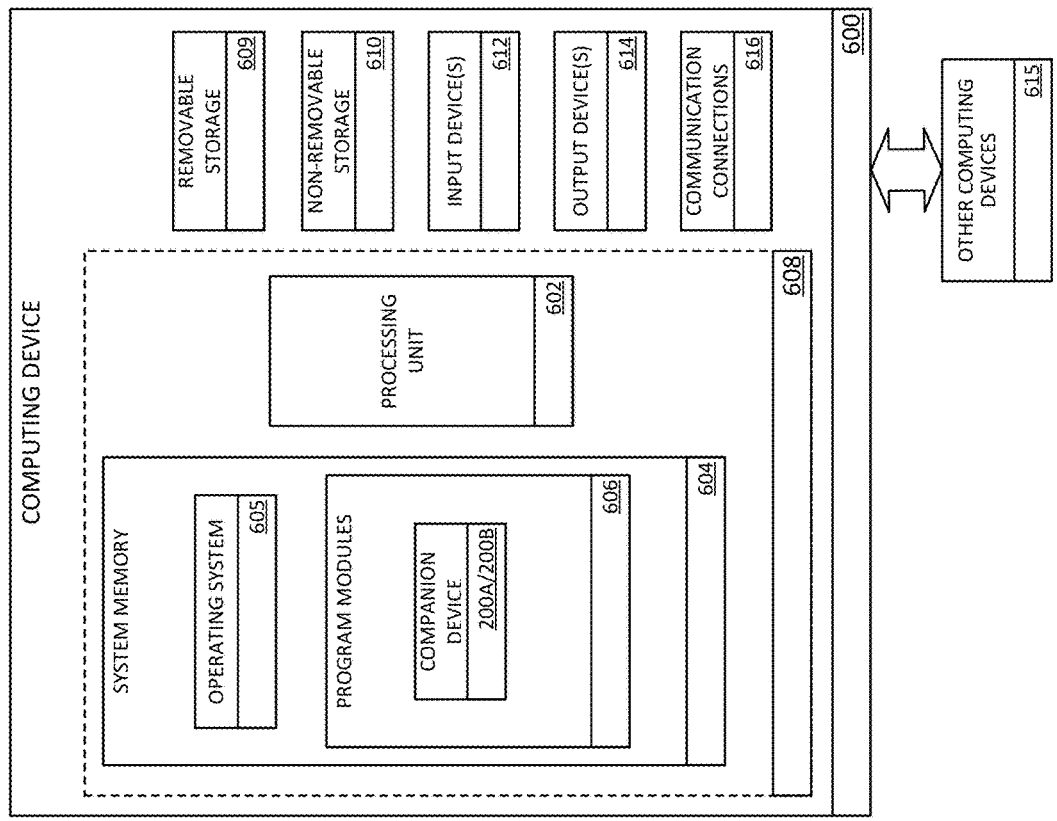
FIG. 6 is a simplified block diagram of a distributed computing system in which aspects of the present disclosure may be practiced.

FIG. 6 is a block diagram illustrating physical components (e.g., hardware) of a computing device 600 with which aspects of the disclosure may be practiced. The computing device components described below may have computer executable instructions for coordinating productivity tools across companion devices. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 suitable for running one or more companion device processing programs. The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 may perform processes including, but not limited to, the aspects, as described herein. Program modules 606 may include companion device operations 200A and 200B, which may be deployed as described in FIGS. 1-5 herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, a gesture or visual input device, etc. The output device(s) 614 such as a display, speakers, a printer, etc. may also be included. The aforementioned devices are examples and others may be used. The computing device 600 may include one or more communication connections 616 allowing communications with other computing devices 615. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 600. Any such computer storage media may be part of the computing device 600. Computer readable media does not include a carrier wave or other propagated or modulated data signal. Computer readable storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A-7G illustrate various user experiences in implementations of the concepts discussed above with respect to FIGS. 1-6. Though a particular client device (e.g., smart phone, tablet, holographic-enabled display device, etc.) may be illustrated in an implementation as a companion device, it is contemplated herein that either client device may be used as the companion device of FIGS. 7A-7G.

Figure 7A:
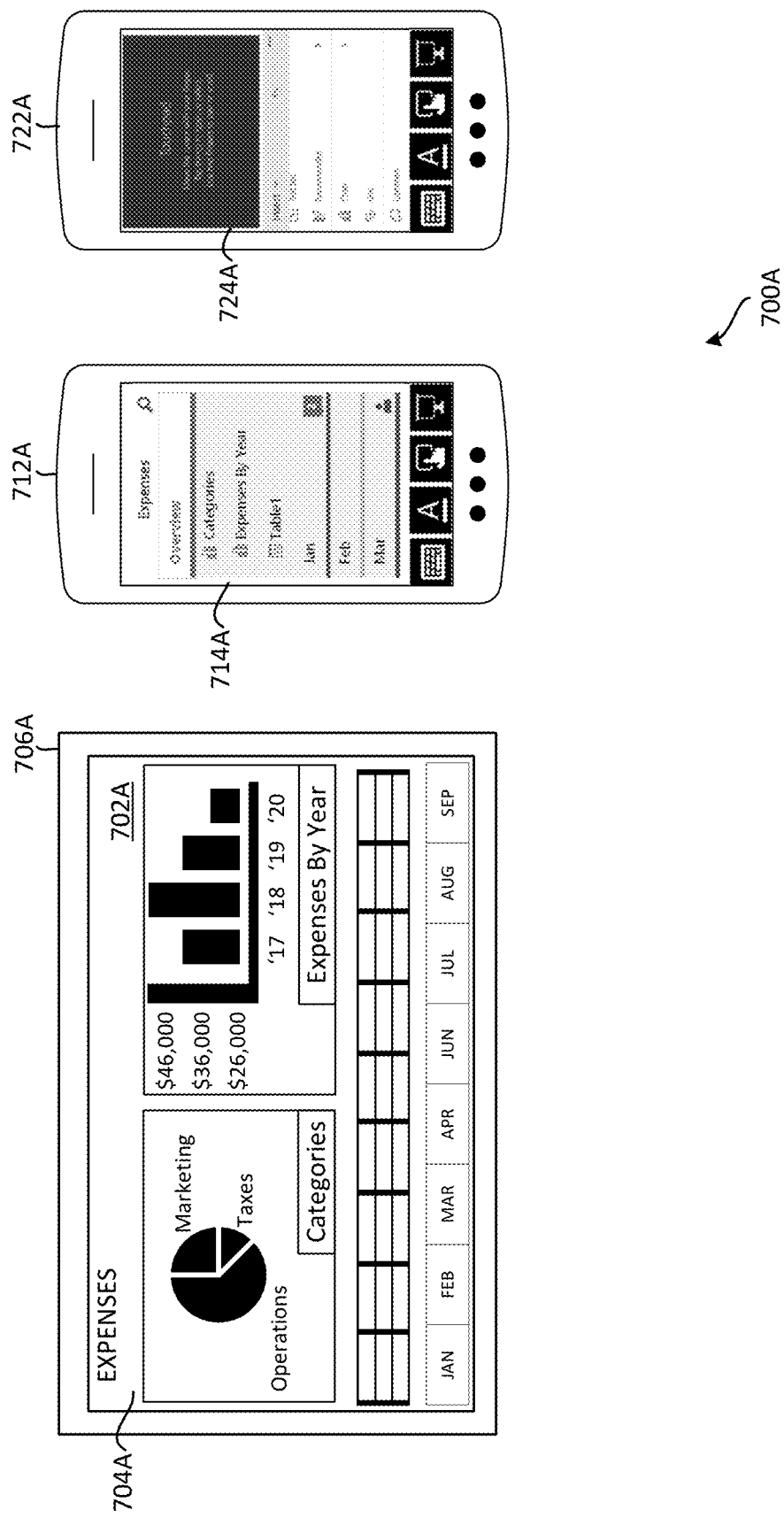
FIG. 7A illustrates a user experience in an implementation.

FIG. 7A illustrates an exemplary user experience 700A in an implementation of the concepts discussed above with respect to FIGS. 1-6. In user experience 700A, electronic document 702A is opened in user interface 704A and displayed via primary computing device 706A. Companion devices 712A and 722A are operatively coupled with primary computing device 706A. As such, they are individually able to interact with the content of electronic document 702A. For example, user interface 714A as displayed by companion device 712A allows a user to jump between tabs and objects of electronic document 702A quickly and easily. When a user selects a particular tab displayed in user interface 714A, primary computing device 706A will respond by displaying the respective tab of electronic document 702A in user interface 704A.

User interface 724A as displayed by companion device 722A allows a user to enter comments, make edits, drag photos from user interface 724A and insert them into user interface 704A, use a camera of companion device 722A to take photos and have the photos appear in user interface 704A, use a microphone of companion device 722A to record and/or receive voice prompts and display and/or otherwise play the voice prompts via primary computing device 706A, and otherwise interact with electronic document 702A while its being displayed via primary computing device 706A.

Both user interfaces 712A and 722A allow users to navigate sections, comments, and view details about coauthors of electronic document 702A without displaying in user interface 704A the chrome for the application features displayed in user interfaces 714A and 724A. Additionally, user interfaces 714A and 724A allow users to toggle between applications (e.g., OneNote®, Skype®, Excel®, etc.) for viewing videos, accessing meeting controls, taking notes, and the like without interrupting the display of document 702A in interface 704A.

Figure 7B:
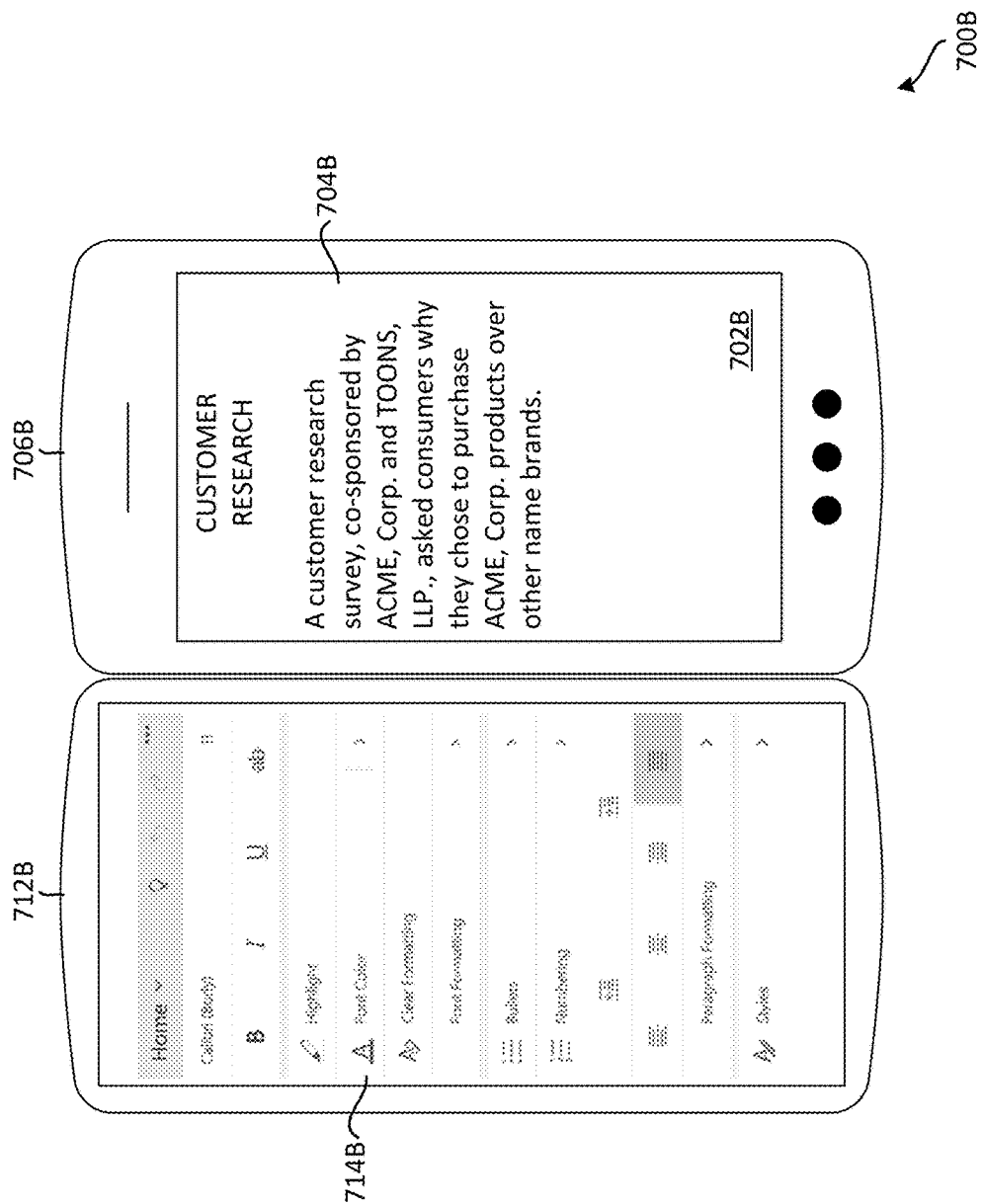
FIG. 7B illustrates a user experience in an implementation.

FIG. 7B illustrates an exemplary user experience 700B in an implementation of the concepts discussed above with respect to FIGS. 1-6. In user experience 700B, electronic document 702B is opened in user interface 704B and displayed via primary computing device 706B. Companion device 712B is operatively coupled with primary computing device 706B and is able to interact with the content of electronic document 702B. For example, user interface 714B as displayed by companion device 712B allows a user to interact with command palettes for altering the textual content displayed in user interface 708B, select content from a clipboard for insertion into electronic document 702B, handwrite text for insertion into electronic document 702B, and otherwise interact with electronic document 702B while its being displayed via primary computing device 706B.

Figure 7C:
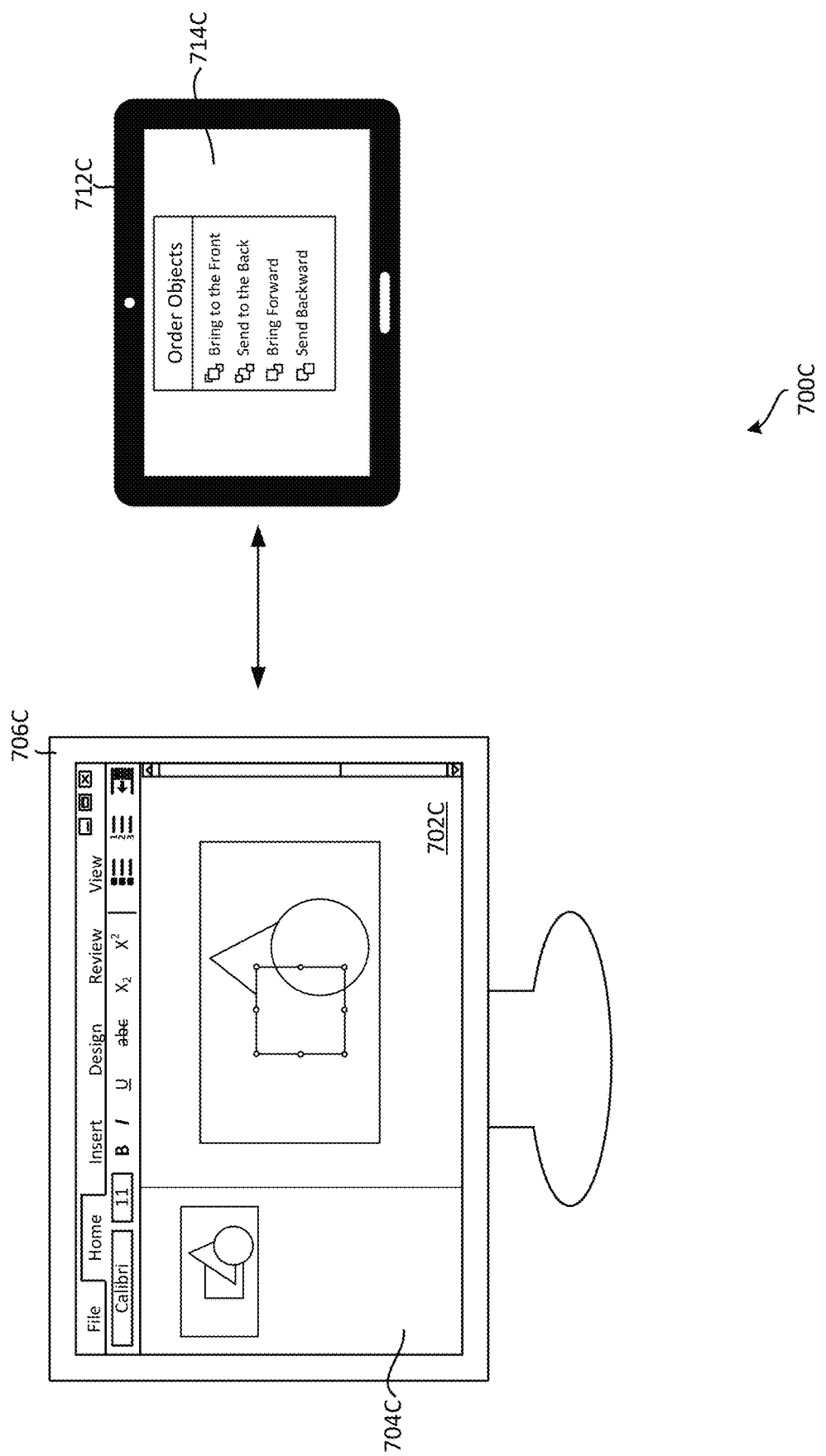
FIG. 7C illustrates a user experience in an implementation.

FIG. 7C illustrates an exemplary user experience 700C in an implementation of the concepts discussed above with respect to FIGS. 1-6. In user experience 700C, electronic document 702C is opened in user interface 704C and displayed via primary computing device 706C. Companion device 712C is operatively coupled with primary computing device 706C and is able to interact with the content of electronic document 702C. For example, user interface 714C as displayed by companion device 712C allows a user to manipulate objects of electronic document 702C without displaying the chrome for the application features in user interface 704C or otherwise interrupting the display of document 702C in interface 704C.

In the present example, user interface 714C provides suggestions for ordering the objects of electronic document 702C. User interface 714C may also be used to change the colors of the objects of electronic document 702C (e.g., via a color palette), provide insights for contextual and/or predictive palettes (e.g., predictive text, predictive images, etc.), and draw objects for insertion into electronic document 702C.

Figure 7D:
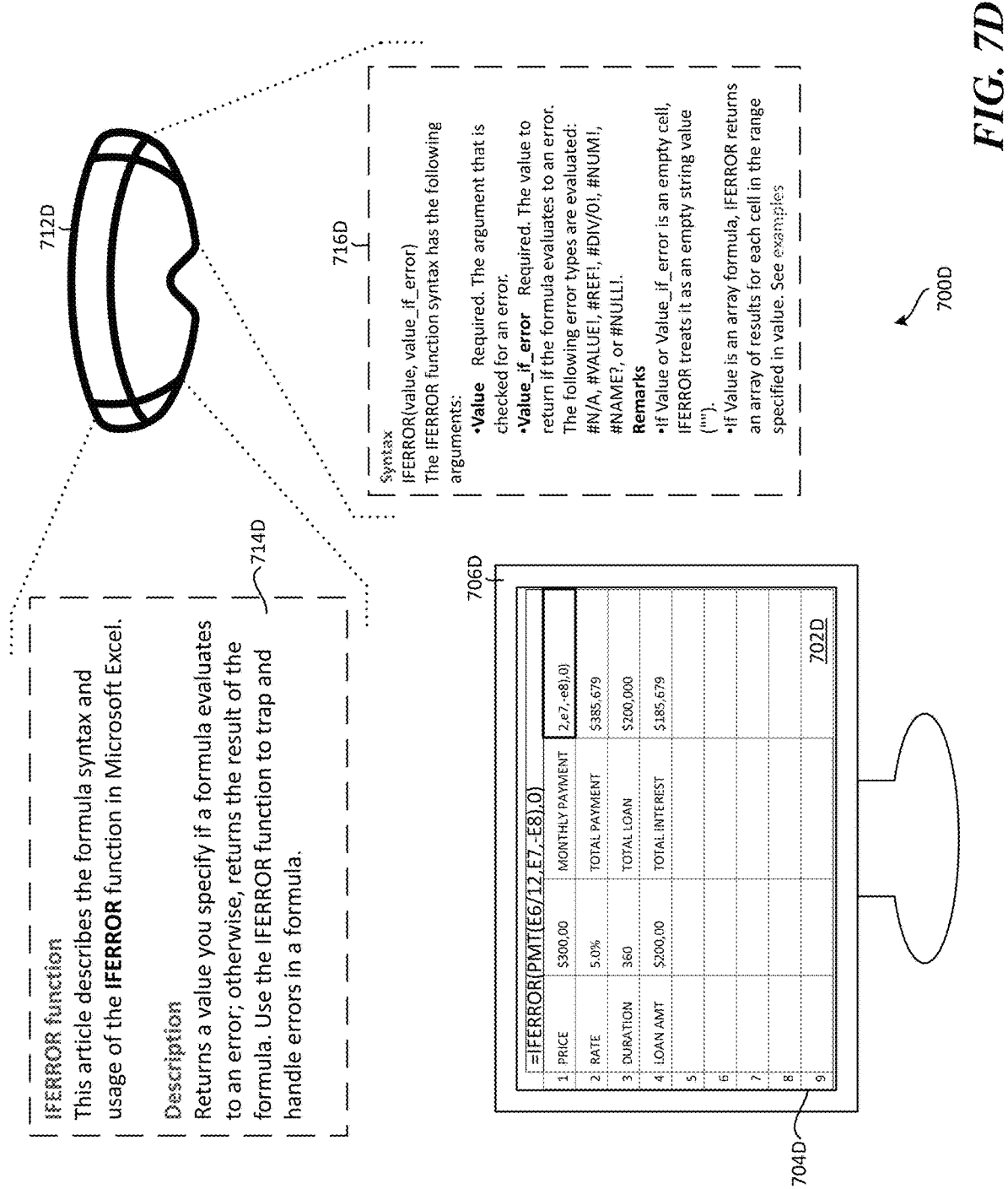
FIG. 7D illustrates a user experience in an implementation.

FIG. 7D illustrates an exemplary user experience 700D in an implementation of the concepts discussed above with respect to FIGS. 1-6. In user experience 700D, electronic document 702D is opened in user interface 704D and displayed via primary computing device 706D. Companion device 712D is representative of mixed reality technology through which holographic augmented authoring may be carried out. For example, a user may enhance the two-dimensional view of user interface 704D by expanding her workspace to user interfaces 714D and 716D, which may be displayed via companion device 712D as "floating" workspaces around the area of primary focus (e.g., primary computing device 706D). User interfaces 714D and 716D may be used to view full-sized versions of documents side-by-side, view alternative layouts of documents, preview spatially oriented content, and view information about document 702D, collaborators, and the like without blocking the content of document 702D. Merely glancing at one theme for a threshold period of time may cause more alternatives to appear that are similar to the one theme and/or cause other edits to document 702D. For example, a user may place an image onto a title slide of document 702D, and user interfaces 714D and 716D may update to show example themes for the slide presentation based on the image. If the user glances at a theme displayed in user interface 714D for 2 seconds or more, user interface 716D may be updated with additional themes that are similar to the one displayed in user interface 714D.

In the present implementation, companion device 712D is operatively coupled with primary computing device 706D. User interfaces 714D and 716D comprise floating task panes through which a user may view information on how to use a formula and/or other relevant help information at a glance. A user may glance at the step-by-step guidance and/or next steps and may gesture or otherwise indicate when a step is "done" or the information is "understood." Additional insights may be surfaced in user interfaces 714D and 716D that provide a user with optional and/or supplemental information related to the content of electronic document 702D (e.g., images related to an article, price comparisons for items in a shopping cart, etc.) without interrupting the primary reading/authoring focus in user interface 704D.

Figure 7E:
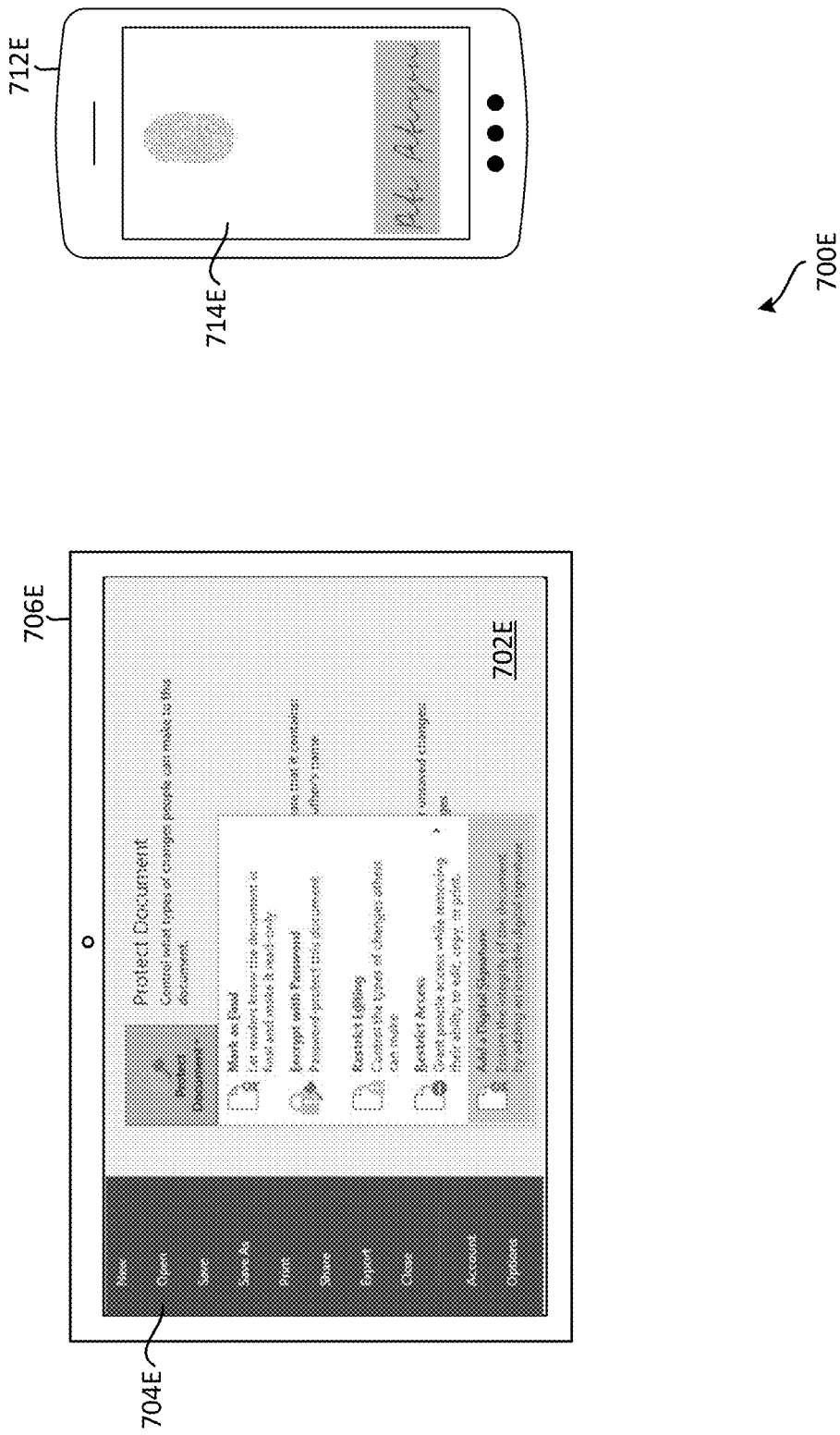
FIG. 7E illustrates a user experience in an implementation.

FIG. 7E illustrates an exemplary user experience 700E in an implementation of the concepts discussed above with respect to FIGS. 1-6. In user experience 700E, protected document 702E is opened in user interface 704E and displayed via primary computing device 706E. Companion device 712E is operatively coupled with primary computing device 706E and is able to interact with the content of protected document 702E. For example, user interface 714E as displayed by companion device 712E, allows a user to access protected document 702E. Specifically, user interface 714E provides an input field for responding to password-protection and/or e-signatures requests. Entering the requested e-signature and/or thumbprint via user interface 714E unlocks protected document 702E.

Figure 7F:
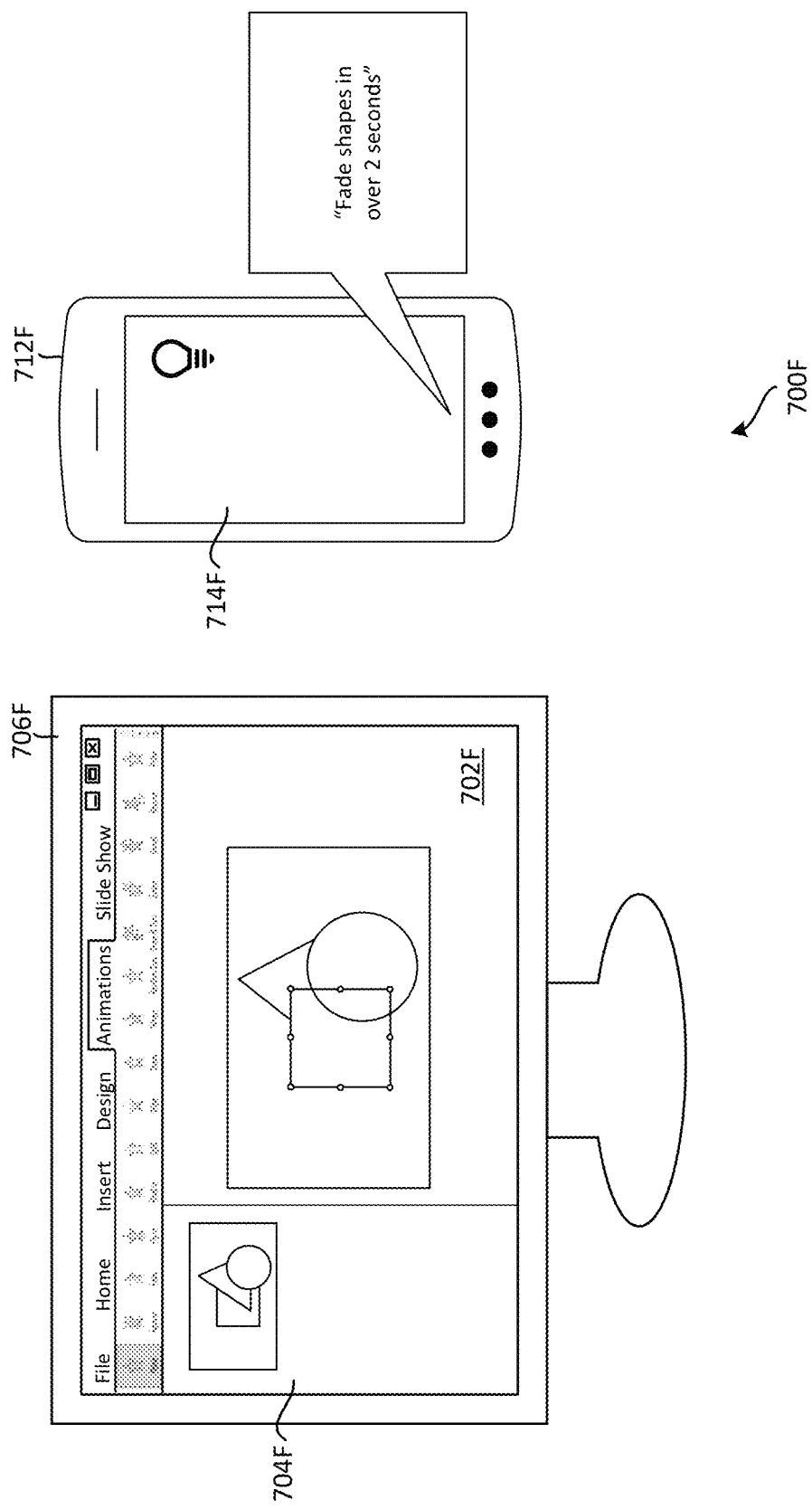
FIG. 7F illustrates a user experience in an implementation.

FIG. 7F illustrates an exemplary user experience 700F in an implementation of the concepts discussed above with respect to FIGS. 1-6. In user experience 700F, electronic document 702F is opened in user interface 704F and displayed via primary computing device 706F. Companion device 712F is operatively coupled with primary computing device 706F and is able to interact with the content of electronic document 702F. For example, desktop PC's rarely have a microphone, let alone a microphone good enough for voice-recognition. The microphone of companion device 712F allows a user to use voice commands to add animation to the content displayed in user interface 704F. Specifically, a user may give a verbal command to fade the shapes of electronic document 702F into view over a two second period, and the animation will be added to electronic document 702F.

Voice controls may also be used to search for supplemental information regarding application functionality and/or about the content of electronic document 702F. Though only a few voice commands are presently discussed, it is contemplated herein that other commands may be used to edit and otherwise interact with document 702F.

Figure 7G:
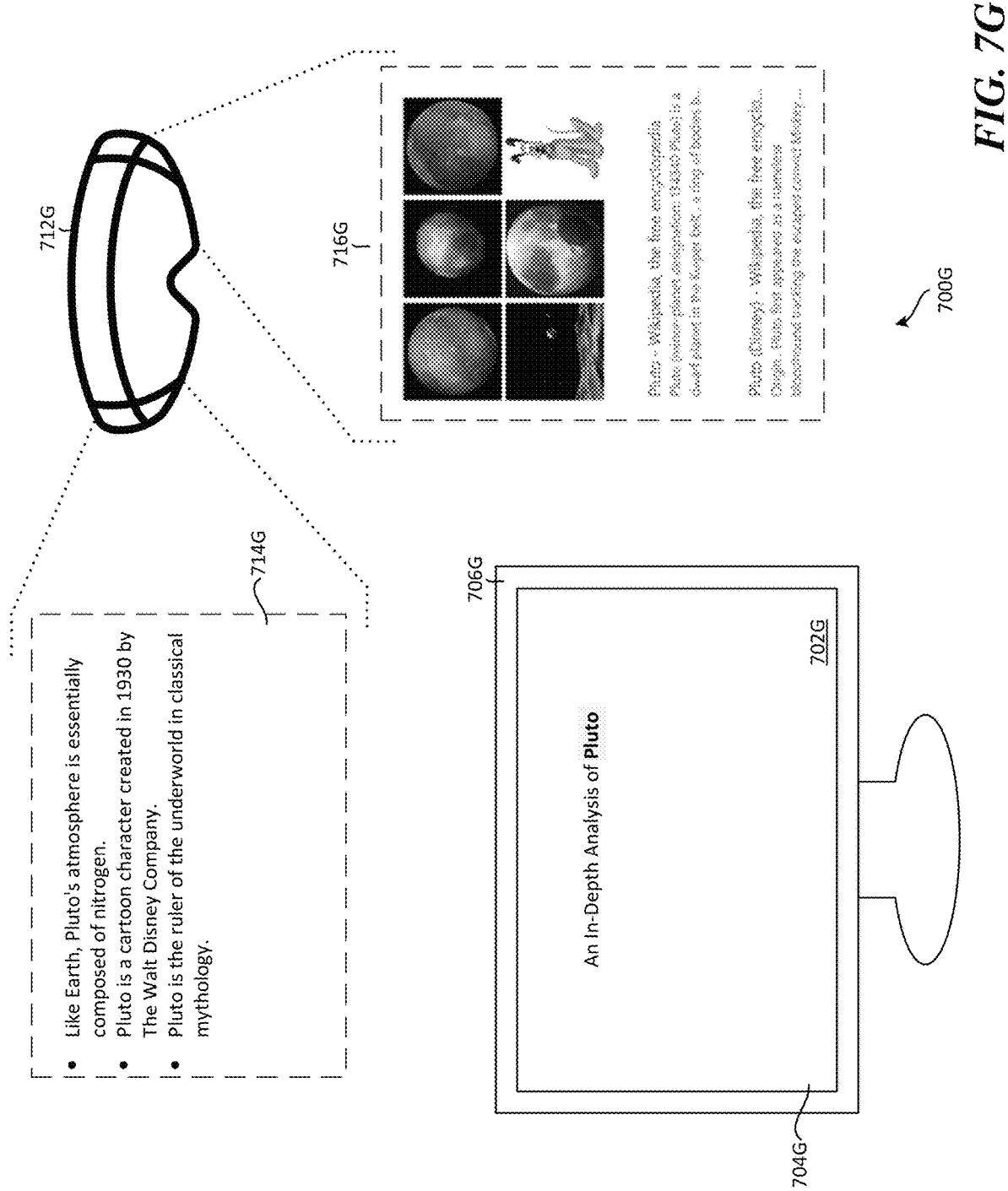
FIG. 7G illustrates a user experience in an implementation.

FIG. 7G illustrates an exemplary user experience 700G in an implementation of the concepts discussed above with respect to FIGS. 1-6. In user experience 700G, electronic document 702G is opened in user interface 704G and displayed via primary computing device 706G. Companion device 712G is representative of mixed reality technology through which holographic augmented authoring may be carried out. Companion device 712G is operatively coupled with primary computing device 706G and is able to interact with the content of electronic document 702G. For example, user interface 714G as displayed by companion device 712G offers suggestions for sentences to include in document 702G based on the highlighted text of document 702G (i.e., Pluto). The sentences may be generated or otherwise curated from a library and/or other source available to companion device 712G. A user may select one or more of the sentences displayed and have the selected sentences added to document 702G.

User interface 716G presents images and other information obtained from a library and/or remote data source (e.g., Wikipedia) based on a search using the highlighted text of document 702G (i.e., Pluto). A user may select one or more of the images and information to obtain additional data. A user may also select one or more of the images and information to have the image/information added to document 702G.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computing device comprising:
   one or more computer readable storage media;
   one or more processors operatively coupled with the one or more computer readable storage media; and
   program instructions stored on the one or more computer readable storage media that, when executed by the one or more processors, direct the computing device to at least:
   display a document in a user interface to an application, wherein the user interface includes a local representation of a spell check feature of the application;
   enter into a companion mode with respect to the spell check feature of the application, wherein the companion mode allows for editing of content from the document using a companion representation of the spell check feature on a different computing device, without displaying the content on the different computing device; and when in the companion mode:

synchronize state between the local representation of the spell check feature and the companion representation of the spell check feature through a relay service remote from both the computing device and the different computing device; and in the user interface, update the content based on a change to the state of the local representation of the spell check feature caused by a change to the state of the companion representation of the spell check feature.

2. The computing device of claim 1 wherein the companion mode allows for editing of the content from the document using the companion representation of the spell check feature on the different computing device without opening the document on the different computing device.

3. The computing device of claim 1 wherein, to synchronize the state between the local representation of the spell check feature and the companion representation of the spell check feature, the program instructions direct the computing device to share a collaboration component with the different computing device through the relay service, wherein the collaboration component comprises a distributed data structure that stores information to reflect the state.

4. The computing device of claim 3 wherein, to synchronize the state between the local representation of the spell check feature and the companion representation of the spell check feature, the program instructions further direct the computing device to send and receive the state through the relay service.

5. The computing device of claim 3 wherein, to synchronize the state between the local representation of the spell check feature and the companion representation of the spell check feature, the program instructions direct the computing device to share the collaboration component directly with the different computing device through a low power wireless link.

6. The computing device of claim 1 wherein the different computing device is not physically connected to the computing device.

7. The computing device of claim 1 wherein the spell check feature changes a misspelled word in the document to a correctly spelled word.

8. A method of operating a computing device comprising:

displaying a document in a user interface to an application on a computing device, wherein the user interface includes a local representation of a spell check feature of the application;

entering into a companion mode with to respect the spell check feature of the application, wherein the companion mode allows for editing of content from the document using a companion representation of the spell check feature on a different computing device; and when in the companion mode:

synchronizing state between the local representation of the spell check feature and the companion representation of the spell check feature through a relay service remote from both the computing device and the different computing device; and in the user interface, updating the content based on a change to the state of the local representation of the spell check feature caused by a change to the state of the companion representation of the spell check feature.

9. The method of claim 8 wherein the companion mode allows for editing of the content form the document using the companion representation of the spell check feature on the different computing device.

10. The method of claim 8 wherein synchronizing the state between the local representation of the spell check feature and the companion representation of the spell check feature comprises sharing a collaboration component with the different computing device through the relay service, wherein the collaboration component comprises a distributed data structure that stores information to reflect the state.

11. The method of claim 10 wherein synchronizing the state between the local representation of the spell check feature and the companion representation of the spell check feature further comprises sending and receiving the state through the relay service.

12. The method of claim 10 wherein synchronizing the state between the local representation of the spell check feature and the companion representation of the spell check feature sharing the collaboration component directly with the different computing device through a low power wireless link.

13. The method of claim 8 wherein the different computing device is not physically connected to the computing device.

14. The method of claim 8 wherein the spell check feature changes a misspelled word in the document to a correctly spelled word.

15. One or more non-transitory computer readable storage media having program instructions stored thereon that, when executed by one or more processors, direct a computing device to at least:

display a document in a user interface to an application, wherein the user interface includes a local representation of a spell check feature of the application;

enter into a companion mode with respect to the spell check feature of the application, wherein the companion mode allows for editing of content from the document using a companion representation of the spell check feature on a different computing device, without displaying the content on the different computing device; and when in the companion mode:

synchronize state between the local representation of the spell check feature and the companion representation of the spell check feature through a relay service remote from both the computing device and the different computing device; and in the user interface, update the content based on a change to the state of the local representation of the spell check feature caused by a change to the state of the companion representation of the spell check feature.

16. The one or more non-transitory computer readable storage media of claim 15 wherein the companion mode allows for editing of the content from the document using the companion representation of the spell check feature on the different computing device without opening the document on the different computing device.

17. The one or more non-transitory computer readable storage media of claim 15 wherein, to synchronize the state between the local representation of the spell check feature and the companion representation of the spell check feature, the program instructions direct the computing device to share a collaboration component with the different computing device through the relay service, wherein the collaboration component comprises a distributed data structure that stores information to reflect the state.

18. The one or more non-transitory computer readable storage media of claim 17 wherein, to synchronize the state between the local representation of the spell check feature and the companion representation of the spell check feature, the program instructions further direct the computing device to send and receive the state through the relay service.

19. The one or more non-transitory computer readable storage media of claim 17 wherein, to synchronize the state between the local representation of the spell check feature and the companion representation of the spell check feature, the program instructions direct the computing device to share the collaboration component directly with the different computing device through a low power wireless link.

20. The one or more non-transitory computer readable storage media of claim 15 wherein the different computing device is not physically connected to the computing device.

* * * * *